(12) United States Patent
Gehret

(10) Patent No.: US 6,877,728 B2
(45) Date of Patent: Apr. 12, 2005

(54) SUSPENSION ASSEMBLY HAVING MULTIPLE TORSION MEMBERS WHICH COOPERATIVELY PROVIDE SUSPENSION TO A WHEEL

(75) Inventor: Greg Gehret, Anna, OH (US)

(73) Assignee: Lakin Manufacturing Corporation, Jackson Center, OH (US)

( * ) Notice: Subject to any disclaimer, the term of this patent is extended or adjusted under 35 U.S.C. 154(b) by 0 days.

(21) Appl. No.: 10/655,262

(22) Filed: Sep. 4, 2003

(65) Prior Publication Data

US 2005/0051938 A1 Mar. 10, 2005

(51) Int. Cl.[7] .............................................. B60G 11/23
(52) U.S. Cl. ................ 267/279; 267/285; 280/124.169
(58) Field of Search ................................ 267/276, 279, 267/280, 281, 285; 280/124.167, 124.169, 280/124.177, 684, 124.13

(56) References Cited

U.S. PATENT DOCUMENTS

| | | | |
|---|---|---|---|
| 2,007,202 A | 7/1935 | Kliesrath | 280/124.135 |
| 2,246,847 A * | 6/1941 | Herreshoff | 267/281 |
| 2,457,583 A | 12/1948 | McCaslin | 280/124.13 |
| 2,467,721 A * | 4/1949 | Avila | 267/280 |
| 2,712,742 A | 7/1955 | Neidhart | |
| 2,715,022 A * | 8/1955 | Krotz | 267/281 |
| 3,220,358 A | 11/1965 | Peras | 267/279 |
| 3,436,069 A | 4/1969 | Henschen | 267/279 |
| 3,601,424 A | 8/1971 | Badland | 280/124.13 |
| 3,687,479 A | 8/1972 | Kober | 280/124.13 |
| 4,690,069 A * | 9/1987 | Willetts | 280/124.169 |
| 5,222,762 A * | 6/1993 | Dion | 280/124.169 |
| 5,411,287 A | 5/1995 | Henschen | 280/124.169 |
| 6,003,888 A | 12/1999 | Godbersen | 280/124.169 |
| 6,588,778 B1 * | 7/2003 | McLaughlin | 280/124.13 |

\* cited by examiner

*Primary Examiner*—Thomas Williams
(74) *Attorney, Agent, or Firm*—Bell, Boyd & Lloyd, LLC

(57) ABSTRACT

The present invention relates to a suspension assembly for a carriage. The suspension assembly, in one embodiment, includes a first torsion member connectable to a carriage frame along a first axis and a second torsion member operatively coupled to the first torsion member along a second axis. A plurality of wheel arms coupled to the second torsion member, which, in turn, are each coupled to wheel spindle. This type of suspension assembly provides carriages with enhanced suspension and reduces damage to carriages during operation.

25 Claims, 14 Drawing Sheets

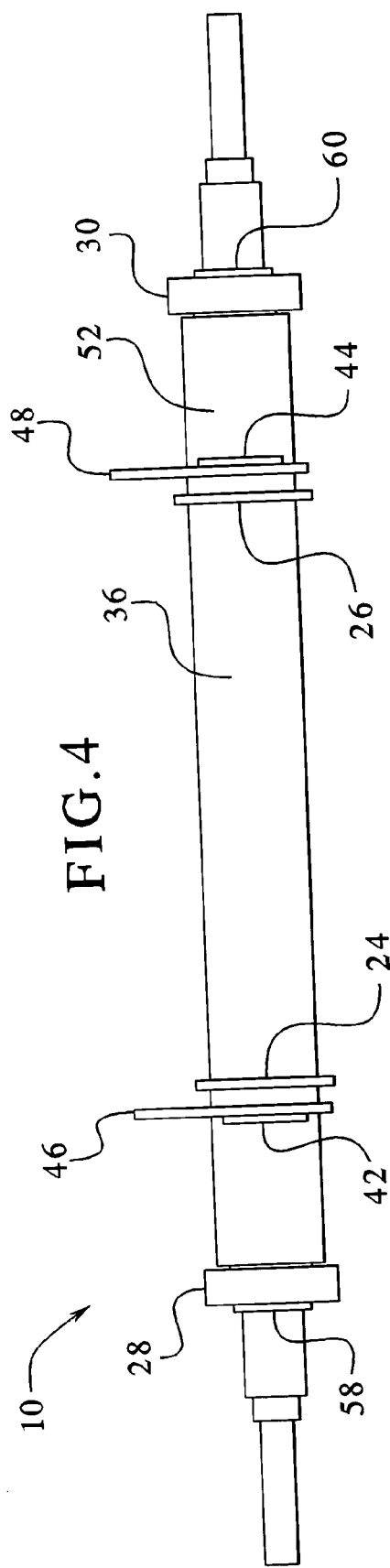
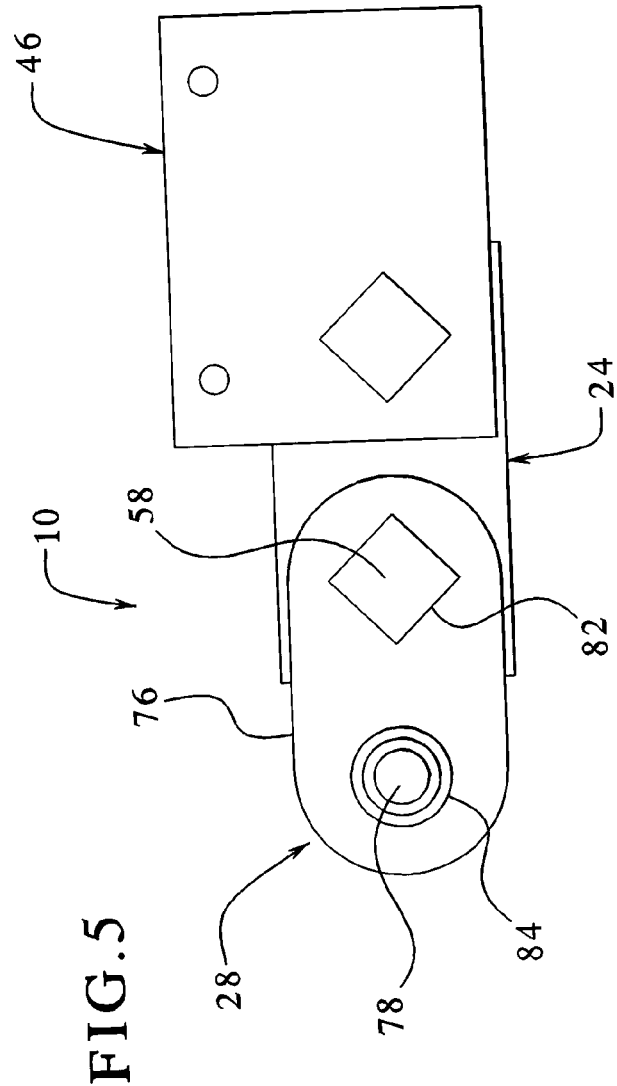

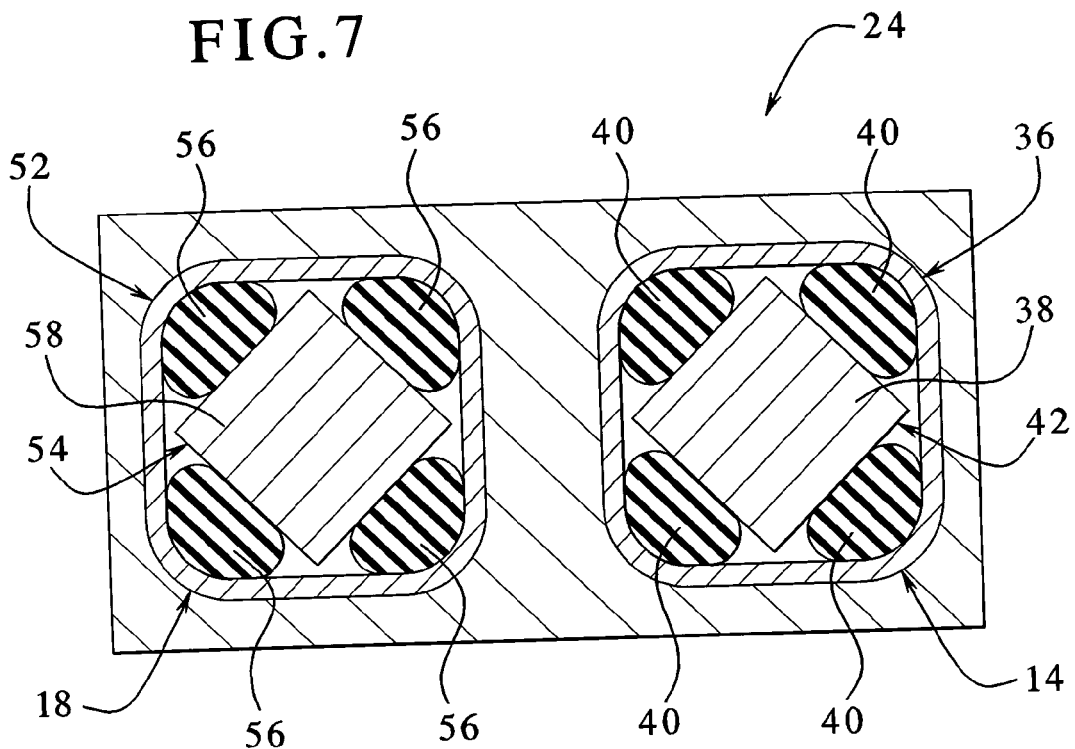
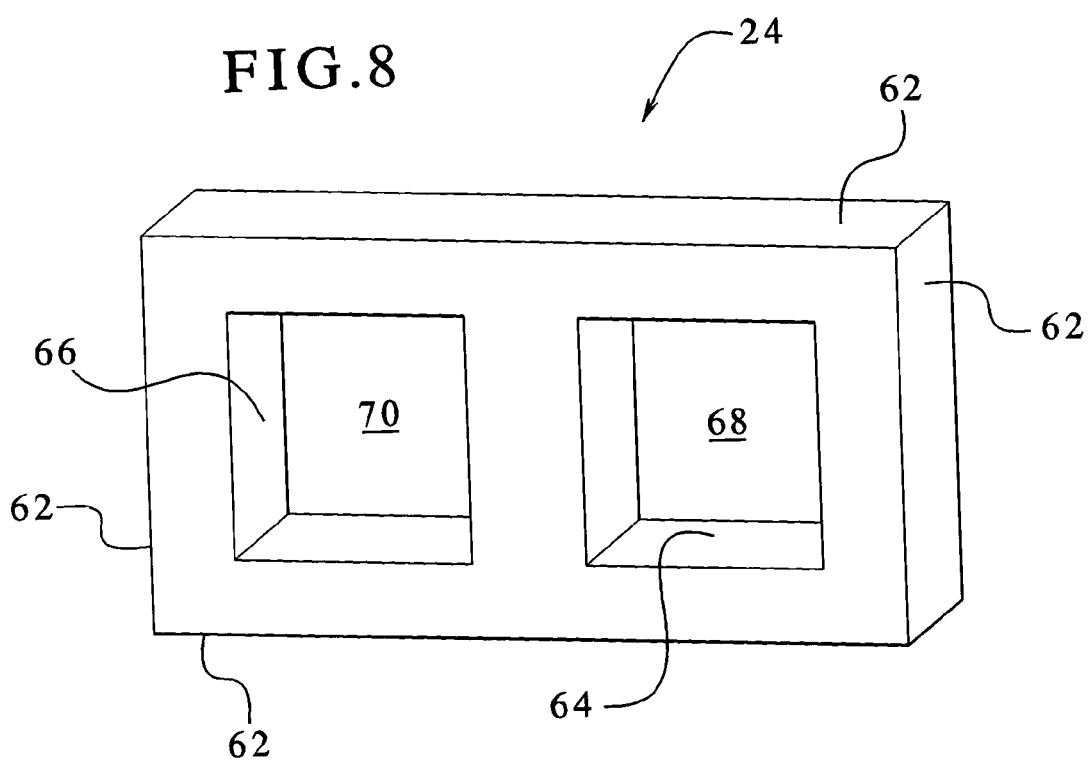

SUSPENSION ASSEMBLY HAVING MULTIPLE TORSION MEMBERS WHICH COOPERATIVELY PROVIDE SUSPENSION TO A WHEEL

BACKGROUND OF THE INVENTION

Various suspension systems have been used in vehicles. Depending upon the type of vehicle, the suspension system may include coil springs, leaf springs, oil or air-type shock absorbers or torsion rods.

The suspension system of one known vehicle includes a single torsion rod coupled to each wheel. Each of the torsion rods provides suspension for a particular wheel. When the vehicle has a full load, each of the torsion rods can reach a maximum absorption or twisting position. At this maximum absorption position, the torsion rods can provide no further suspension. Accordingly, one of disadvantages of this vehicle is that impacts can damage the vehicle if, for example, the operator places a full load on the vehicle and drives the vehicle over a bump or other irregularity in the driving surface.

In an attempt to overcome this disadvantage, another know vehicle described in U.S. Pat. No. 5,411,287 uses a suspension system having four torsion shafts positioned along a common axis within the rear axle of the vehicle. A pair of interconnected torsion shafts closest to each rear wheel provides suspension for that rear wheel. For each rear wheel, when the vehicle has no load or a relatively light load, only one of the torsion shafts provides suspension for that wheel. When the vehicle has a full load, this torsion shaft can reach a maximum or absorption or twisting position. At this position, this torsion shaft provides little or no suspension for such wheel. When this occurs, the other torsion shaft provides suspension for that wheel. Therefore, at any such point in time, only one torsion shaft has a relatively significant role in providing suspension to a rear wheel of the vehicle. In addition, with the torsion shafts being aligned along a common axis, this suspension system limits the vertical travel of the wheels to a relatively small range, which, in turn, limits the suspension of the vehicle. For these reasons, when this vehicle is under a full load, the suspension can be exhausted. Accordingly, one of the disadvantages of this vehicle is that impacts can damage the vehicle if the operator places a full load on the vehicle and drives the vehicle over a bump or other irregularity in the driving surface.

Therefore, there is a need to overcome each of these disadvantages.

SUMMARY OF THE INVENTION

The present invention relates to a suspension assembly for vehicles, trailers and other engine driven or pull-along carriages. In one embodiment, the suspension assembly functions as a rear axle which includes: (a) a first torsion shaft mounted to the frame of the carriage; (b) a second torsion shaft operatively connected to the first torsion shaft; and (c) a plurality of wheel arms connected to the second torsion shaft which, in turn, are connected to a plurality of wheels. It is preferable that a plurality of rigid plates or other torsion member connectors are used to connect the first torsion shaft to the second torsion shaft. The torsion member connectors space the two torsion shafts apart from one another on two different axes. These axes are spaced apart and are preferably parallel.

When an operator places a full load on the carriage, the torsion shaft located furthest from the wheels preferably absorbs or twists until it substantially reaches a maximum twisting position. As this occurs, the force from the load is also transmitted to the second torsion shaft, and the second torsion shaft undergoes a partial or a minimum amount of absorption or twisting. This is due, in part, to the distance between the first torsion shaft and the second torsion shaft. Therefore, the second torsion shaft functions partially as a primary torsion shaft and mostly as a reserve torsion shaft during larger or full load conditions. If the operator drives the carriage over an irregularity in the driving surface or if the operator overloads the carriage, the reserve torsion shaft will twist, thereby absorbing or dissipating shocks from impacts in order to reduce damage to the carriage.

The suspension assembly of the present invention, in one embodiment, is a torsion-type suspension assembly which includes multiple torsion shafts positioned along different axes. The torsion shafts include an inner steel rod which are directly connected to one another by multiple steel plates. One of the torsion shafts is coupled to a set of wheels. The multiple torsion shafts act together, preferably simultaneously, in a cooperative fashion to provide suspension for the carriage. This type of suspension assembly reduces damage to carriages from harmful impact and shocks transmitted to the carriage when the carriage is under full load.

It is therefore an advantage of the present invention to provide a suspension assembly housing multiple torsion members which cooperatively provide suspension to a wheel.

Another advantage of the present invention is to provide a suspension assembly which has a relatively substantial degree of torsional deflection available during full load conditions.

Yet another advantage of present invention is to increase the range of vertical travel for wheels coupled to one or more torsion members. Still another advantage of the present invention is to provide suspension to a wheel with a plurality of torsion members which simultaneously receive force from a load. Another advantage of the present invention is to decrease damage to carriages.

Additional features and advantages of the present invention are described in, and will be apparent from, the following Detailed Description of the Invention and the figures.

BRIEF DESCRIPTION OF THE FIGURES

FIG. 4 is a front elevated view of the suspension assembly in one embodiment of the present invention removed from a vehicle or carriage.

FIG. 5 is a left side elevated view of the suspension assembly in one embodiment of the present invention removed from a vehicle or carriage.

FIG. 7 is a cross-sectional view of the suspension assembly of FIG. 3, taken substantially along line 7—7 of FIG. 3.

FIG. 8 is a side perspective view of the torsion member connector in one embodiment of the present invention.

DETAILED DESCRIPTION OF THE INVENTION

Figure 1:
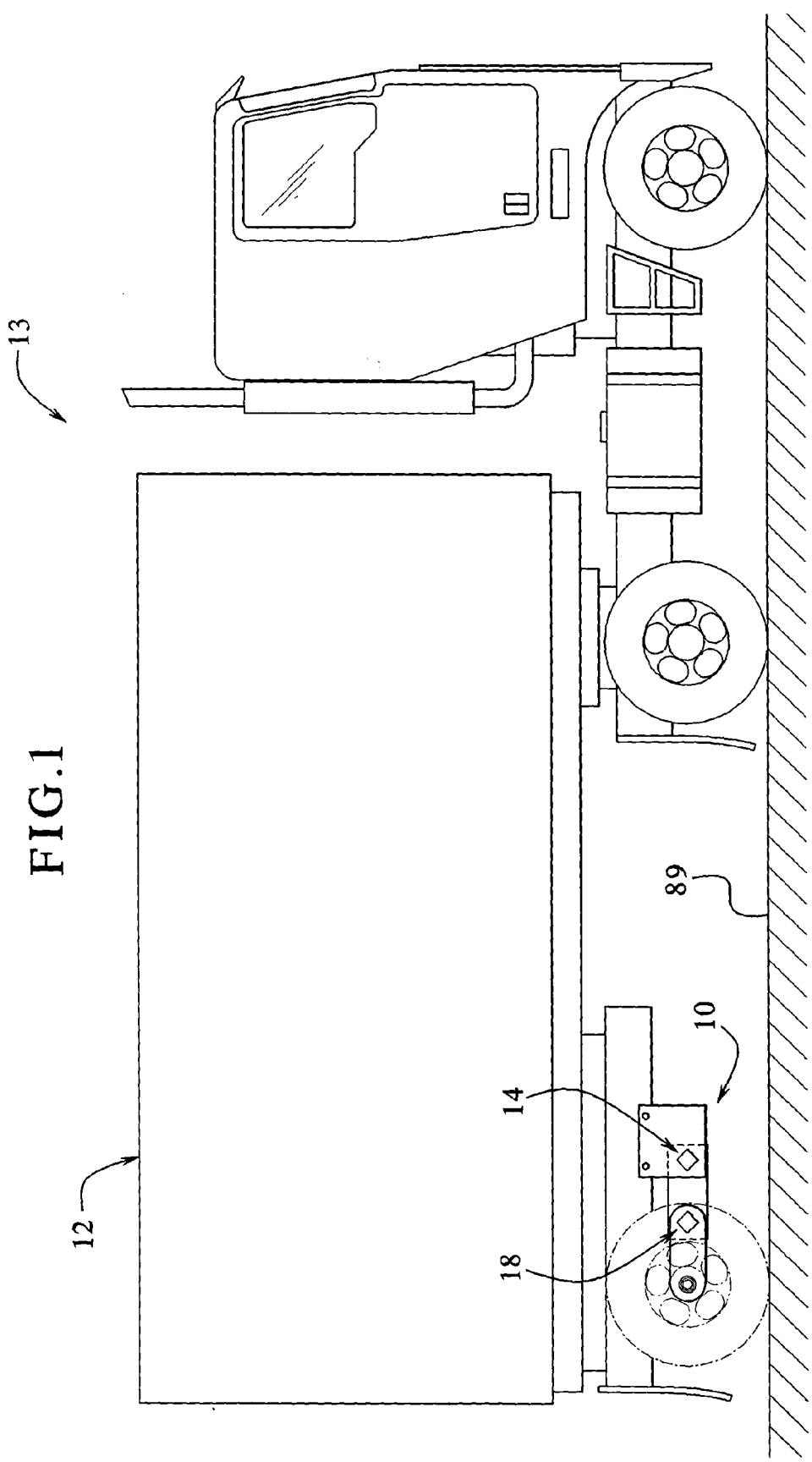
FIG. 1 is an elevated left side view of a tractor-trailer which includes the suspension assembly in one embodiment of the present invention.
Figure 2:
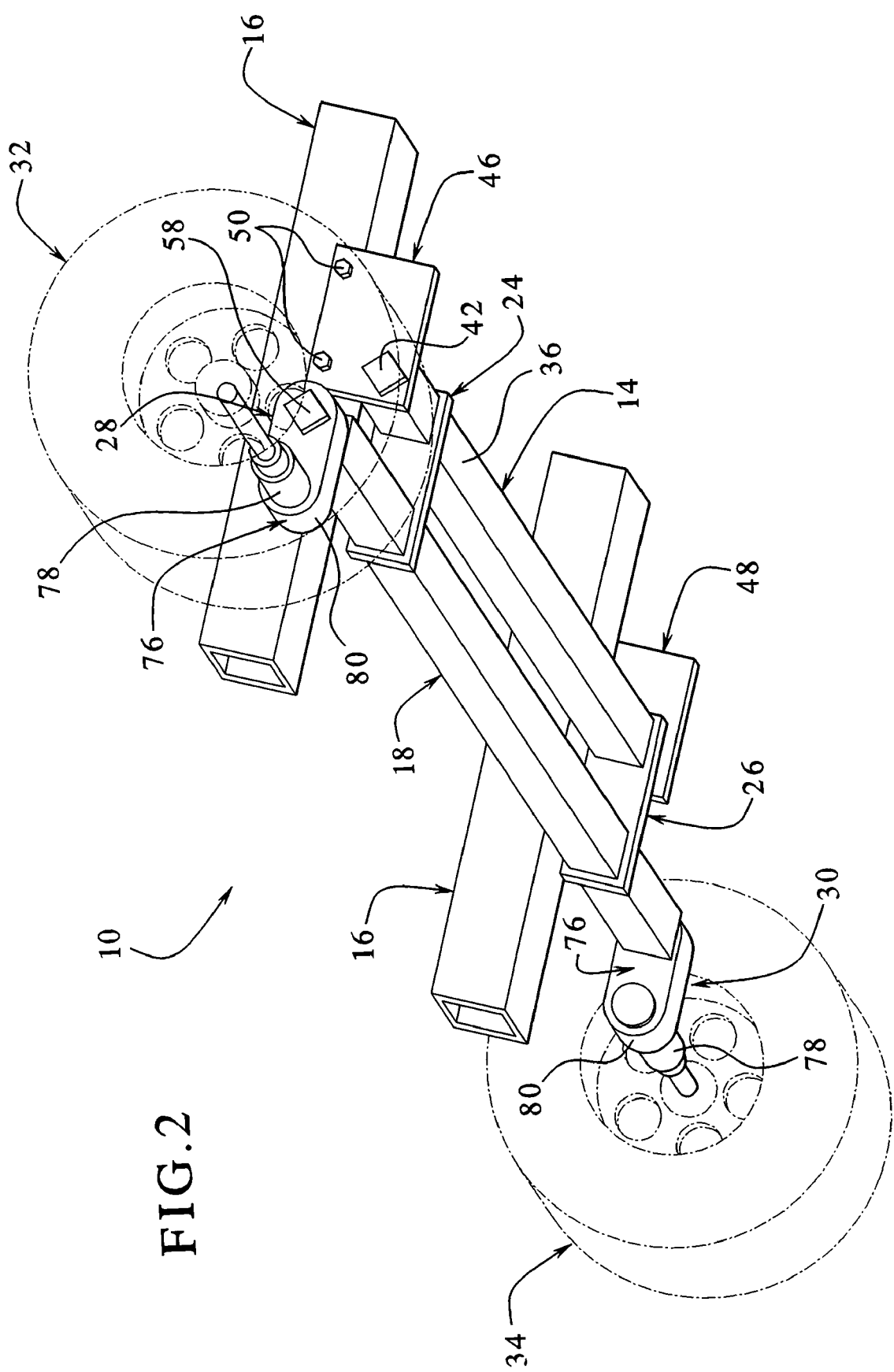
FIG. 2 is a rear bottom perspective view of the suspension assembly in one embodiment of the present invention.
Figure 3:
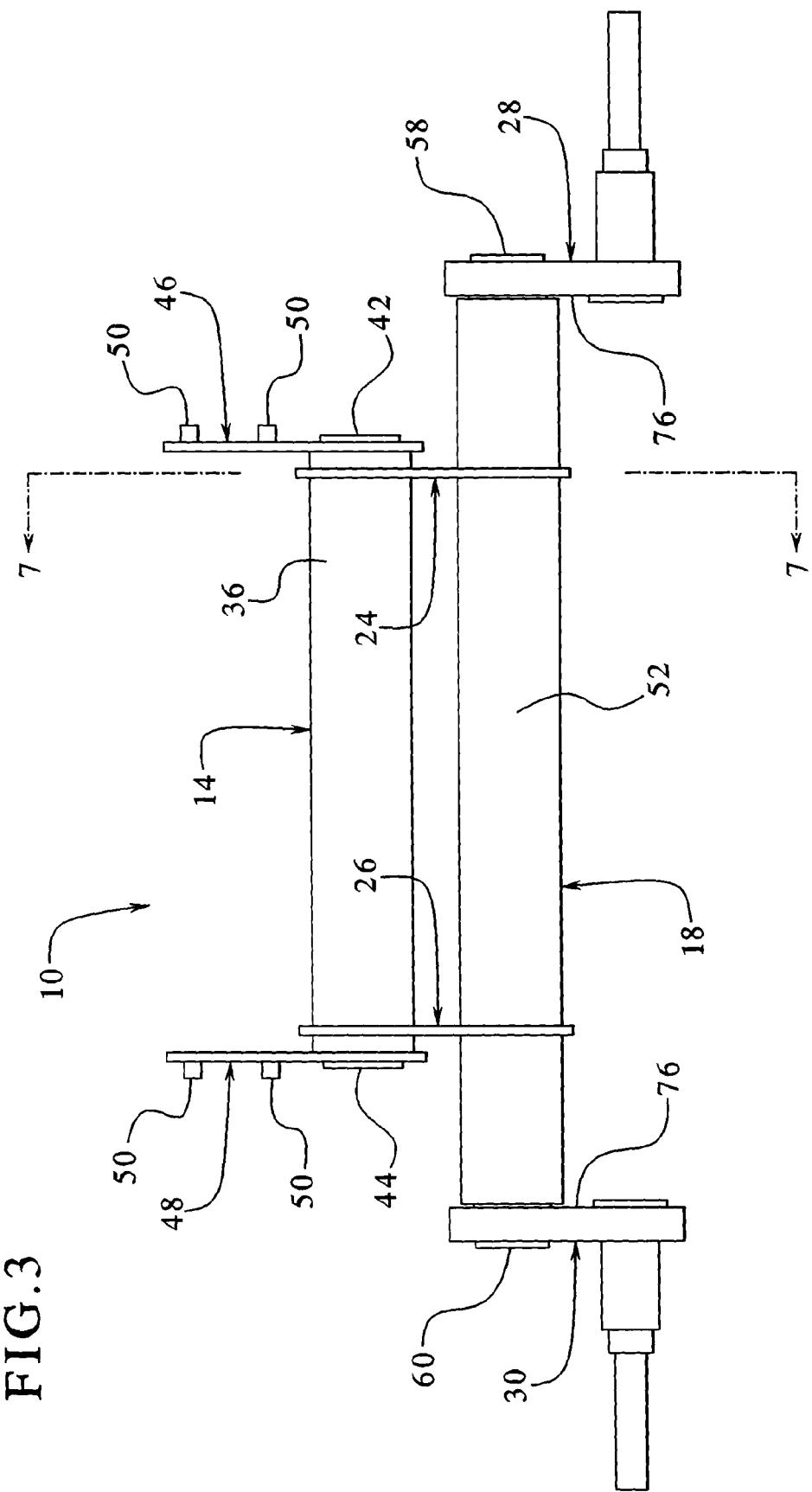
FIG. 3 is a top or plan view of the suspension assembly in one embodiment of the present invention removed from a vehicle or carriage.
Figure 6:
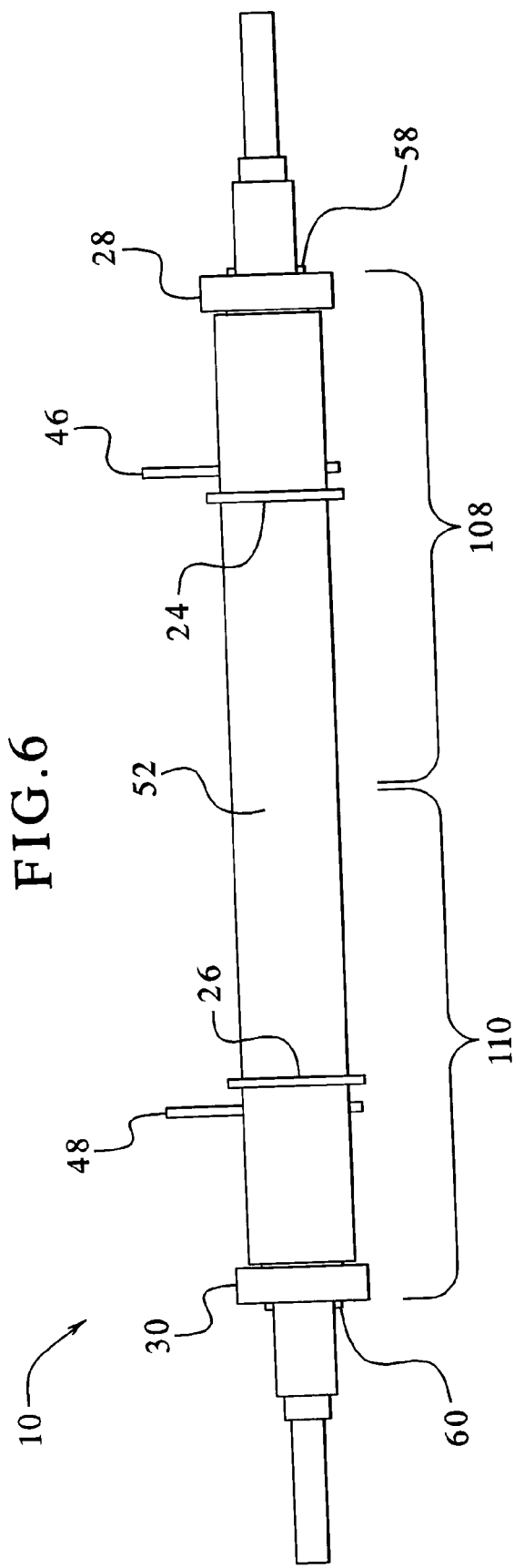
FIG. 6 is a rear elevated view of the suspension assembly in one embodiment of the present invention removed from a vehicle or carriage.

Referring now to the drawings, FIGS. 1 through 16 illustrate the suspension assembly of one embodiment of the present invention. The suspension assembly of the present invention can be included in or installed on any suitable carriage, including, but not limited to, any truck automobile, tractor or other vehicle, any machine with wheels, any wagon or any trailer, such as carriage 12 of the tractor-trailer 13. In one embodiment of the present invention illustrated in FIGS. 1 through 15, the suspension assembly 10 includes: (a) an elongated torsion member 14 rigidly coupled to the frame 16 of the carriage 12: (b) an elongated torsion member 18 operatively coupled to the elongated torsion member 14: (c) a plurality of torsion member connectors 24 and 26 which operatively couple the elongated torsion member 14 to the elongated torsion member 18; (d) a plurality of wheel arms 28 and 30 which couple the elongated torsion member 18 to a plurality of wheels 32 and 34, respectively.

In this embodiment, the carriage 12 is illustrated as a trailer, such as a tractor trailer, whose rear wheels 32 and 34 are not driven by drive axles or drive transmission. Furthermore, the suspension assembly 10 functions in this embodiment as a rear axle in addition to functioning as a suspension system. In this sense, the suspension assembly 10 is preferably included within or constitutes an axle assembly for the carriage 12. In other embodiments, such as the embodiment illustrated in FIG. 16 and described below, the suspension assembly of the present invention can provide suspension for wheels which are driven by transmissions.

As best illustrated in FIG. 7, the elongated torsion member 14 preferably includes: (a) an outer elongated member 36 which houses an inner elongated member 38; and (b) a plurality of elongated deformation members or deformable members 40 positioned between the outer elongated member 36 and the inner elongated member 38. The outer elongated member 36 is preferably a substantially square shaped rigid tube constructed of a suitable steel or metal. The inner elongated member 38 is preferably a substantially square shaped solid steel rod, tube or shaft having ends 42 and 44. The ends 42 and 44 can have any suitable shape although it is preferable that the ends 42 and 44 have a substantially square shape. The deformable members 40 are each preferably a flexible rubber rod which has resilient and memory characteristics. It should be appreciated that the deformable members 40 can include any suitable cushioning member, biasing member, elastomeric member or any other member having resilient and memory characteristics constructed of any suitable material. Although the deformable members 40 preferably have a substantially circular cross-sectional shape, the deformable members 40 can be adapted to have any suitable geometric shape. The ends 42 and 44 are rigidly connected to frame mounts 46 and 48, preferably through a weld connection. The frame mounts 46 and 48 are rigidly connected to the frame 16, preferably through a plurality of bolts 50.

Similarly, also as best illustrated in FIG. 7, the elongated torsion member 18 preferably includes: (a) an outer elongated member 52 which houses an inner elongated member 54; and (b) a plurality of deformable members 56 positioned between the outer elongated member 52 and the inner elongated member 54. The outer elongated member 52 is preferably a rigid substantially square tube constructed of a suitable steel or metal. The inner elongated member 54 is preferably a substantially square shaped steel rod or shaft having ends 58 and 60. The ends 58 and 60 preferably have a substantially square shape although the ends 58 and 60 can have any suitable geometric shape. These members are preferably made of the same materials as the above torsion member 14.

The torsion member connectors 24 and 26 are preferably identical in structure and function. The following description of torsion member connector 24 therefore describes torsion member connector 26. As best shown in FIG. 8, it is preferable that torsion member connector 24 is a one piece or integrally formed member including: (a) an outer wall 62 and a plurality of inner walls 64 and 66 located within the perimeter of the outer wall 62. The inner wall 64 defines an opening 68 which receives the outer elongated member 36 of the torsion member 14. The inner wall 66 defines an opening 70 which receives the outer elongated member 52 of the elongated torsion member 18. The inner walls 64 and 66 preferably have a substantially square shape which conforms to the substantially square shape of the outer elongated members 36 and 52, respectively. It should be appreciated that the inner walls 64 and 66 can be adapted to have any suitable shape to mate with the outer elongated members 36 and 52, which may have non-square shapes in embodiments not illustrated. As illustrated, it is preferable that the inner walls 64 and 66 function as female mating members which receive the outer elongated members 36 and 52 in such a manner that outer elongated members 36 and 52 are non-rotatably secured to the torsion member connector 24. It should be appreciated that the outer elongated members 36 and 52 can be secured to the torsion member connector 24 in manners not illustrated, such as through the use of welding, bolts or other suitable fasteners. The torsion member connector 24 also functions as a spacer which maintains a predetermined distance between the longitudinal axes defined by the elongated torsion members 14 and 18.

Accordingly, both of the torsion member connectors 24 and 26 maintain the torsion member 14 positioned along an axis which is different than the axis defined by torsion member 18. These two axes of the torsion members 14 and 18 are preferably parallel.

Figure 9:
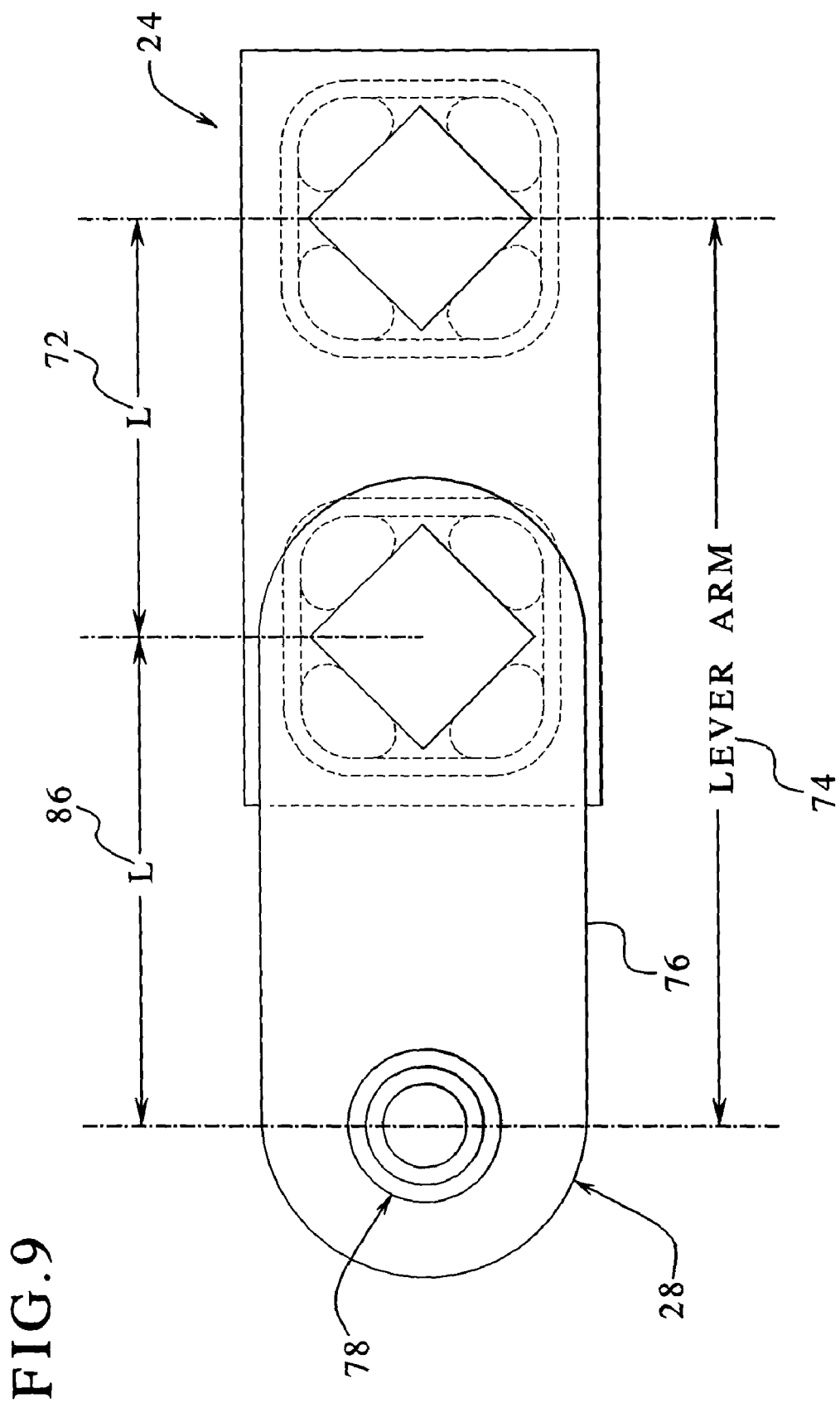
FIG. 9 is an elevated side view of the torsion member connector and wheel arm in one embodiment of the present invention.

Referring to FIG. 9, the length 72 of the torsion member connectors 24 and 26 defines a portion of a lever arm 74. As described below, the lever arm 74 causes the elongated torsion member 14 to twist or deflect under a constant load preferably before the elongated torsion member 18 twists or deflects under such constant load. The lever arm 74 also preferably adjusts the force distribution to the torsion members 14 and 18 so that under a full load, the torsion member 14 may reach a maximum twisted position but the torsion member 18 preferably does not reach a maximum twisted position.

The wheel arms 28 and 30 each include an arm 76 and a wheel shaft or spindle 78. The arm 76 defines an outer wall 80 and a plurality of inner walls 82 and 84. The inner walls 82 of each wheel arm 28 function as torsion member engagement walls which receive the inner elongated member 54. The inner wall 82 has a configuration which mates with the configuration of the elongated member 54. The inner wall 84 functions as a wheel spindle engagement member which receives the wheel spindle 78. It is preferable that the wheel spindle 78 is rigidly connected to the wheel arm 76.

Specifically, with respect to wheel arm 28, the inner wall 82 receives the end 58 of the torsion member 18 in a non-rotatable fashion. The end 58 is preferably welded to the arm 76. With respect to wheel arm 30, the inner wall 82 receives the end 60 of the torsion member 18 in a non-rotatable fashion. It is preferable that the end 60 is welded to the arm 76.

As best shown in FIG. 9, the arm 76 has a length 86 which defines a portion of the lever arm 74. The length 72 of the torsion member connector 24 and the length 86 of the wheel arm together define the overall length of the lever arm 74. It should be appreciated that the length of the lever arm 74 can be adjusted by increasing or decreasing length 72 and/or length 86. The present invention is therefore adjustable so that torsion member 18 does not reach a maximum deflection state when the carriage 12 has a full load. This is due, in part, to the lever arm 74 functioning as a force converter or force distribution characteristic which disproportionately distributes force to the torsion member 14 and the torsion member 18. Preferably, when the carriage 12 is under full load, only the torsion member 14 reaches a maximum deflection state. It is preferable that, in operation, the torsion members 14 and 18 simultaneously receive force transmitted from the wheels in various driving conditions when the carriage is under various loads. It should be appreciated that by adjusting the length of the lever arm 74, the present invention can be adapted for different types of carriages and different loads on those carriages. For example, the present invention can be constructed to have one length of lever arm 74 for one type of carriage and a different length of lever arm 74 for a different type of carriage.

Figure 10:
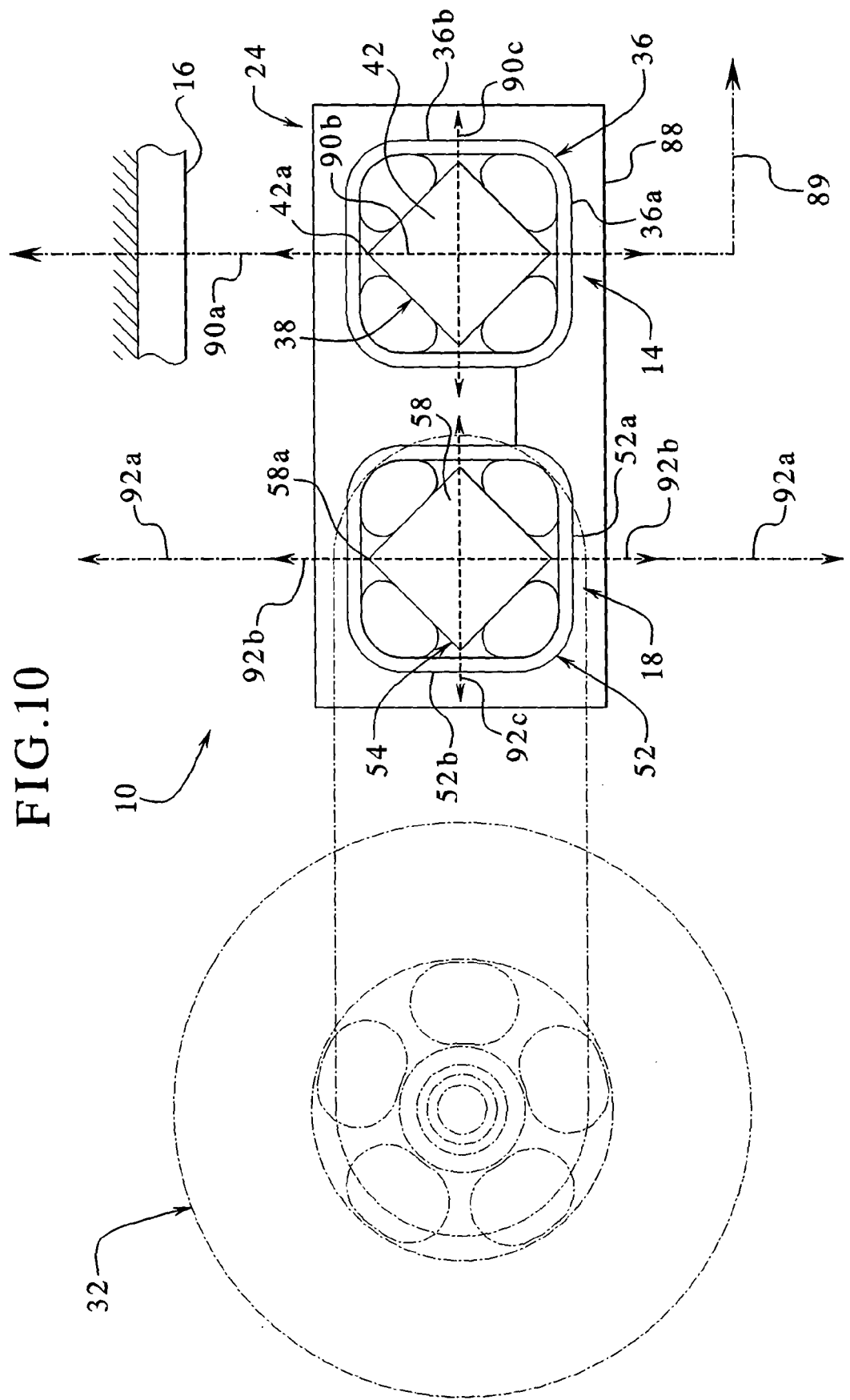
FIG. 10 is a schematic diagram illustrating a no load positioning of the suspension assembly in one embodiment of the present invention.

As best illustrated in FIGS. 1 and 10, when the carriage 12 has no load or a relatively light load, the torsion members 14 and 18 are not deflected or twisted. The torsion member connector 24, at this point, has a no load position or orientation. For illustration purposes, outer elongated member 52 is centered at the intersection of axes 92b and 92c and axes 92b and 92c intersect with the sides 52a of elongated member 52 at a right angle. Also, for illustration purposes, outer elongated member 36 is centered at the intersection of axes 90b and 90c, and axes 90b and 90c intersect with sides 36a and 36b of elongated member 36 at a right angle. In one example, sides 88 of the torsion member connector 24 are perpendicular or substantially perpendicular to the axis 90a when the torsion member connector 24 has a no load orientation. In addition, the ends 42 and 58 of the torsion members 14 and 18, respectively, have a no load orientation. In the example illustrated, the end 42 has an upper point 42a which is positioned along the axis 90a, and axis 90 is perpendicular or substantially parallel to side 36a of the outer elongated member 36. The end 58 has a point 58a which is positioned along the vertical axis 92a. The angular position of axis 92a relative to axis 90a can vary depending upon design considerations. Generally, it should be understood that, in a no load orientation, the inner elongated member 38 and the inner elongated member 54 can each have any suitable angular position relative to axes 90a and 92a, respectively. This angular setting is preferably a design variable. Once this angular orientation is determined and set, it should be understood that since the end 42 of the torsion member 14 is rigidly connected to the frame 16, the end 42 preferably has a fixed orientation relative to vertical axis 90a independent of the load placed on the carriage 12 or the impact imparted to the carriage 12.

Figure 11:
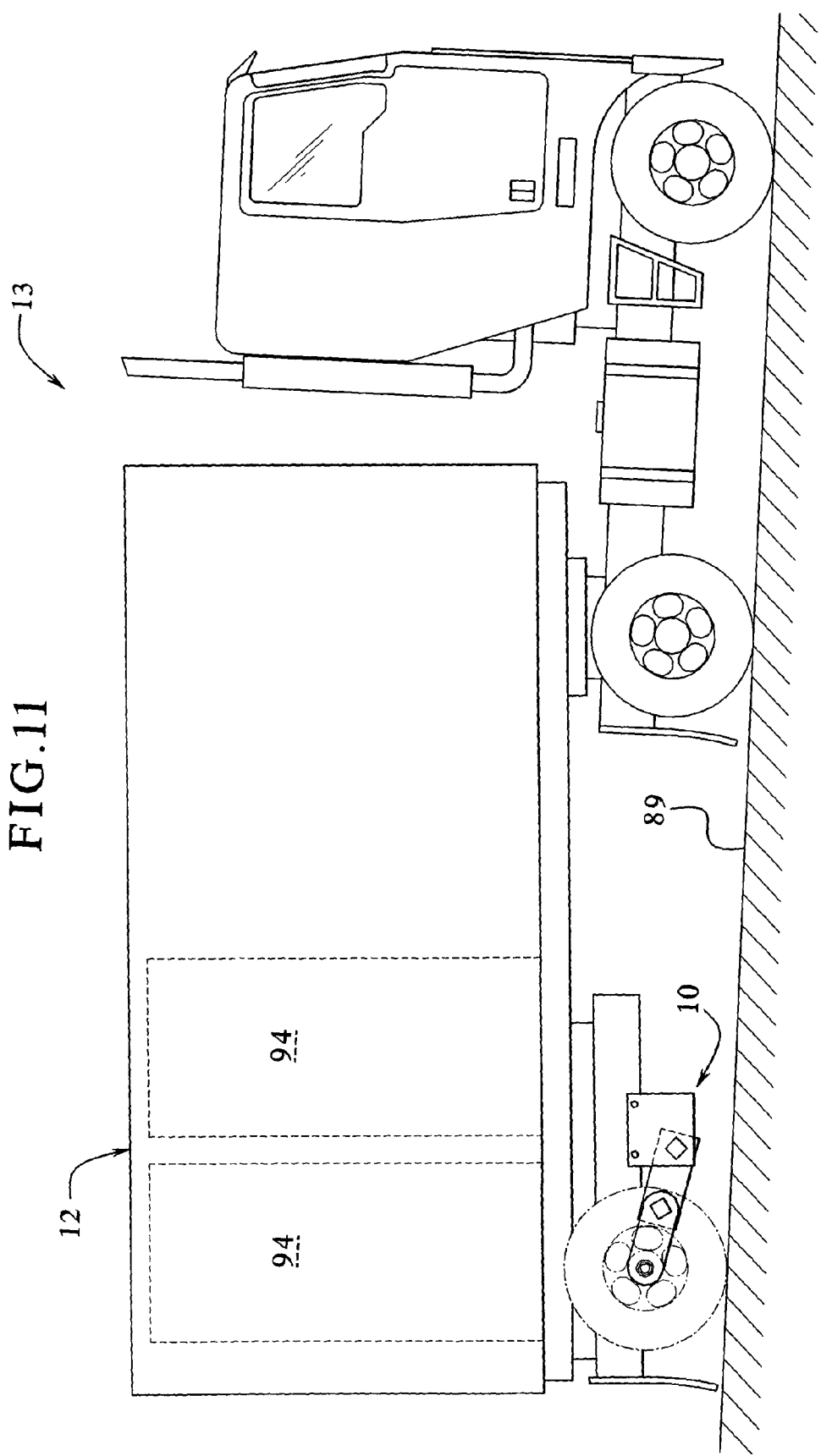
FIG. 11 is an elevated left side view of a tractor-trailer including the suspension assembly under a full load in one embodiment of the present invention.
Figure 12:
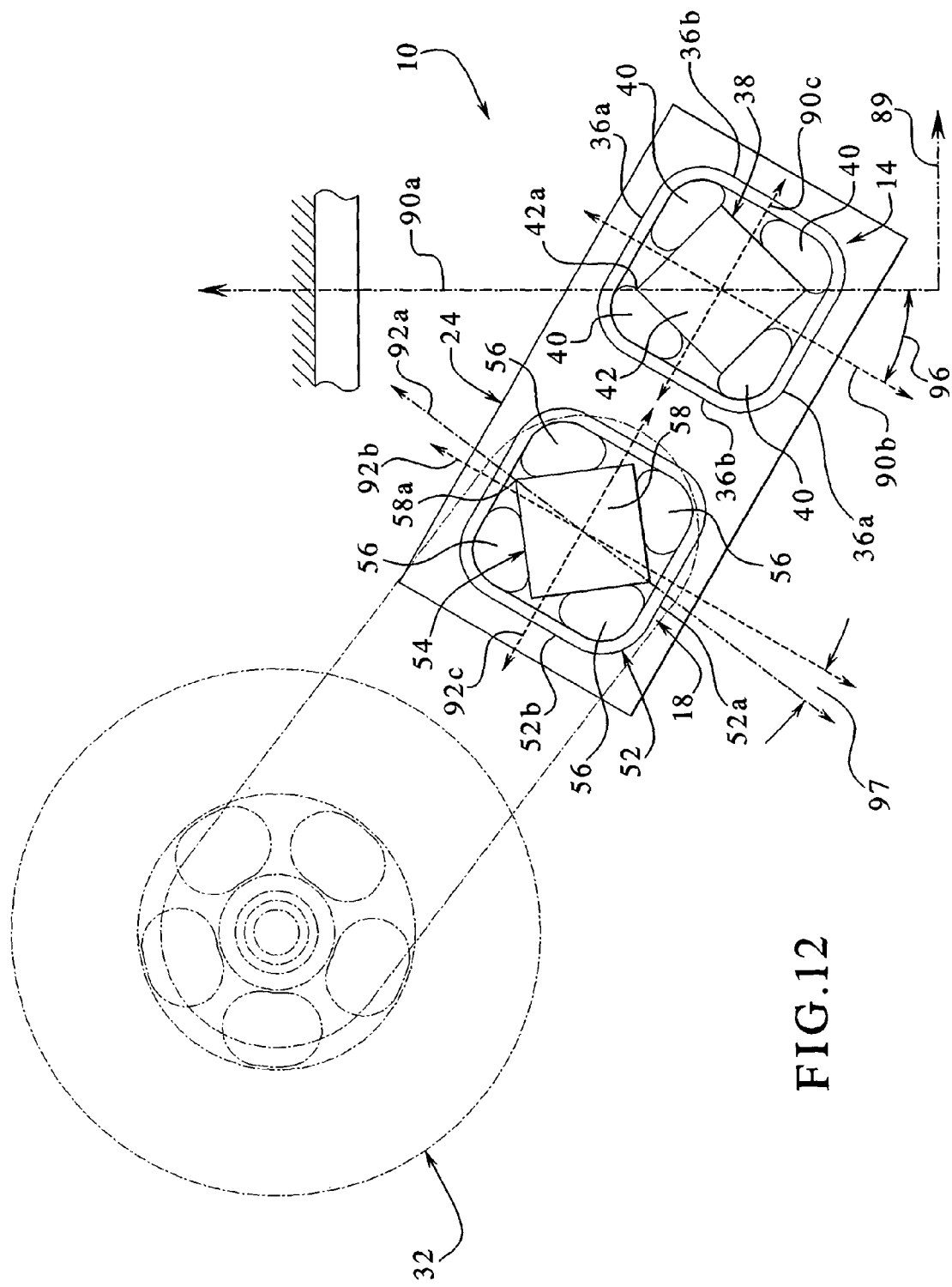
FIG. 12 is a schematic diagram illustrating the full load positioning of the suspension assembly in one embodiment of the present invention.

As illustrated in FIGS. 11 and 12, in one example the carriage 12 may carry a plurality of tanks 94 which provide the carriage 12 with a full load. Here, the point 42a of the end 42 maintains its pre-set position along vertical axis 90. The force from the driving surface is transmitted from wheel 32 through the torsion member connector 24 which applies an upward or clockwise force, causing the outer elongated member 36 to rotate clockwise. The deformable members 40 then change shape, enabling the outer elongated member 36 to rotate through an angle 96. Simultaneously, the deformable members 56 are compressed (to a relatively slight degree), enabling the outer elongated member 52 to rotate through an angle 97. In this particular example, the angle 96 is preferably in the range of twenty degrees to forty degrees, and the angle 97 is preferably in the range of five degrees to ten degrees. Due to the lever arm 74 (illustrated in FIG. 9), a greater degree of torque is applied to the torsion member 14 than the torsion member 18. Preferably, the torsion member 14 initially serves a greater role in suspension than does torsion member 18. However, it is preferable that at most or all times the force transmitted from the driving surface through the wheel 32 is transmitted to both of the torsion members 14 and 18. As the load is increased or decreased, the torsion members 14 and 18 cooperatively provide varying degrees of suspension to the carriage 12.

Referring again to FIG. 12, when the torsion member connector 24 rotates clockwise, the torsion member 18 moves upward or vertically in an arc fashion. Although the torsion member 18 moves in this fashion, it is preferable that the inner elongated member 54 does not significantly twist or has little substantial movement relative to the outer elongated member 52.

Figure 13:
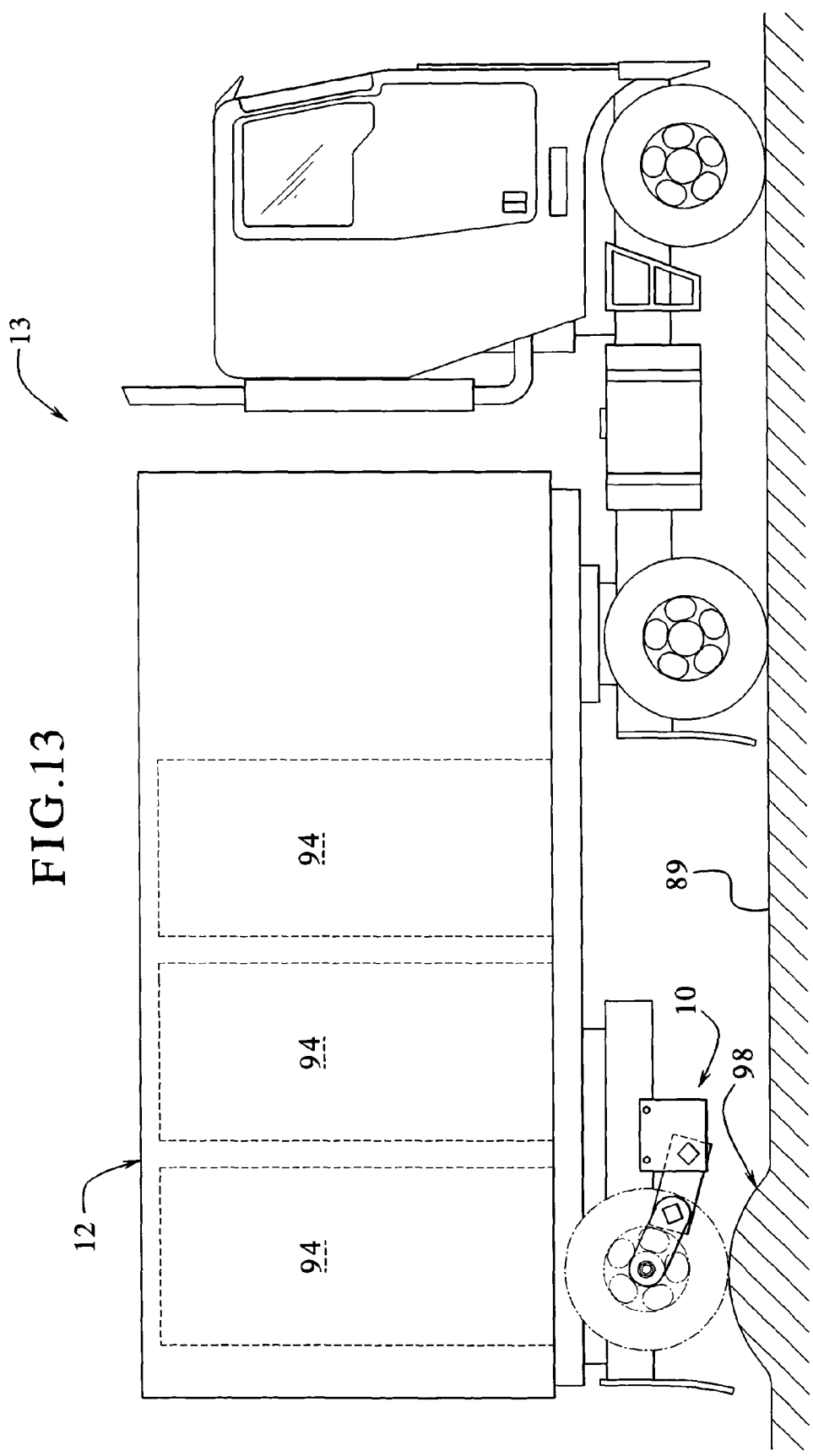
FIG. 13 is an elevated left side view of a tractor-trailer including the positioning of the suspension assembly under a full load while receiving a driving surface impact in one embodiment of the present invention.
Figure 14:
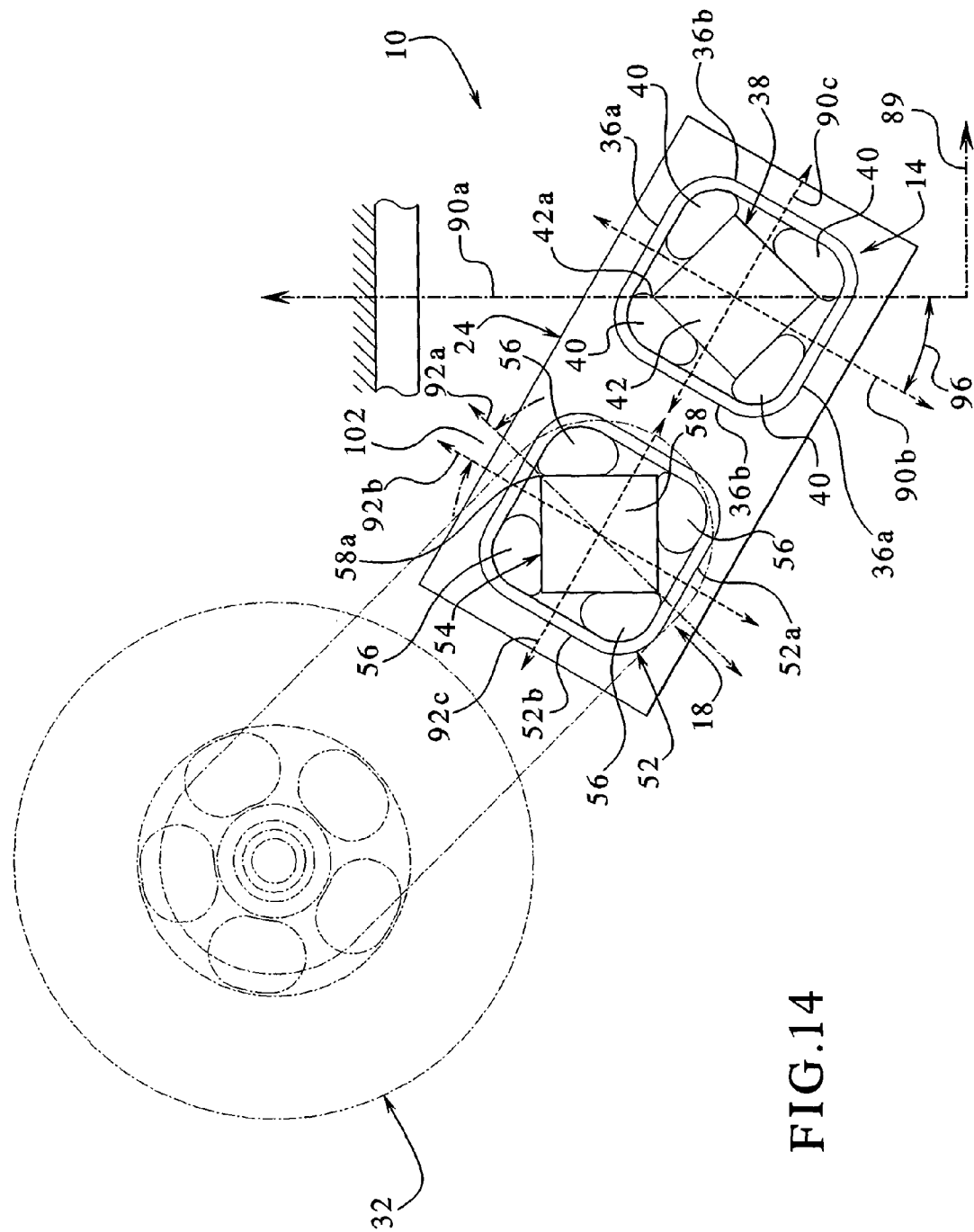
FIG. 14 is a schematic diagram illustrating the positioning of the suspension assembly under a full load and a driving surface impact in one embodiment of the present invention.

In one example illustrated in FIGS. 13 and 14, the carriage 12 is under a full load due to two tanks 94, and the, wheel 32 receives an impact or shock from a irregularity 98 in the driving surface 89. When this occurs, the force of the irregularity 98 is first transmitted from the wheel 32 to the torsion member 18. Because the torsion member 14 is maximally twisted or deflected, the force from the irregularity 98 is substantially directly transmitted to the inner elongated member 54 which, in turn causes the inner elongated member 54 to twist or deflect in a clockwise direction. Therefore, the point 58a of the end 58 is positioned at an angle 102 relative to the axis 92. The deformable members 56 change shape, enabling the inner elongated member 54 to have such rotation relative to the outer elongated member 52. The angle 102 is preferably in the range of twenty degrees to forty degrees. In this scenario, even though the carriage 12 is under full load, the torsion member 18 will absorb or otherwise dissipate part or all of the damaging shock from an irregularity 98 in the driving surface 100. In this sense, the elongated torsion member 18 functions in part as an impact protector which absorbs shock from time to time while the carriage 12 is being operated under a full load in order to prevent or reduce damage to the carriage 12.

Figure 15:
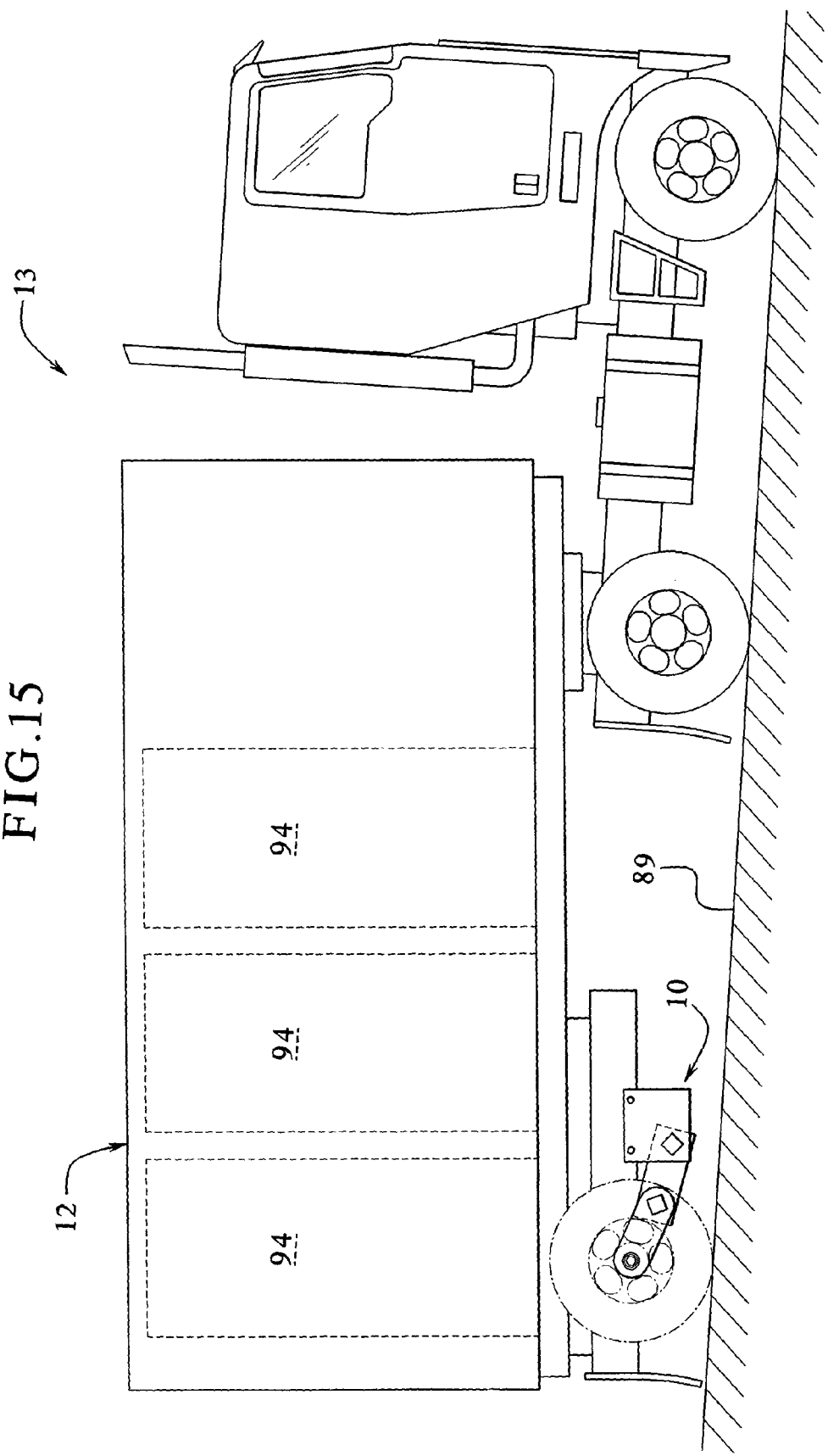
FIG. 15 is an elevated left side view of a tractor-trailer including an over-loaded suspension assembly in one embodiment of the present invention.

In another example illustrated in FIGS. 14 and 15, the carriage 12 is overloaded, for example, by placing three tanks 94 on the carriage 12. The torsion members 14 and 18 will respond as described above with respect to FIG. 14. Therefore, if the carriage 12 is overloaded, the carriage 12 can still be operated, and the torsion member 18 will absorb part or all of the shock coming from irregularities in the driving surface.

Figure 16:
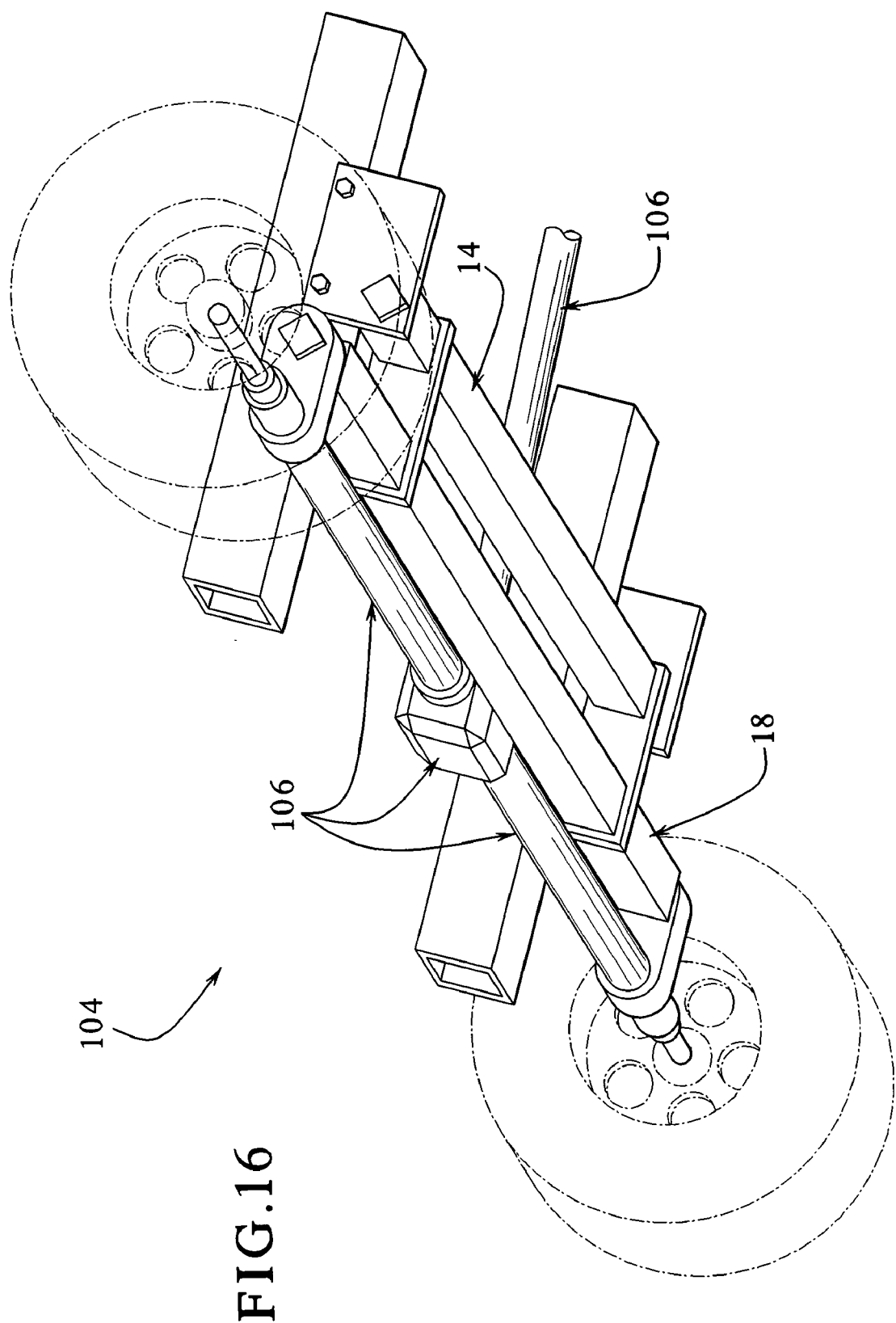
FIG. 16 is a rear bottom perspective view of the suspension assembly coupled to a drive transmission in one embodiment of the present invention.

In another embodiment illustrated in FIG. 16, the suspension assembly 104 is operatively coupled to a suitable drive transmission 106. Though not illustrated, in this embodiment the suspension assembly 106 is preferably adapted to provide independent suspension to each wheel 32 and 34. In operation, the drive transmission 106 drives the wheels 32 and 34, and the torsion member 14 and 18 cooperatively provide suspension for the wheels 32 and 34.

Except for the direction of the forces and the direction of movement, the functionality described above regarding torsion member connector 24, end 42 of inner elongated member 38, end 58 of inner elongated member 54 and wheel 32 is the same for torsion member connector 26, end 44 of inner elongated member 38, end 60 of inner elongated member 54 and wheel 34. Referring back to FIG. 6, in operation, if different loads are distributed to wheels 32 and 34 or if a driving surface shock is received by one wheel 32 but not by the other wheel 34, it is preferable that when portion 108 of the suspension assembly undergoes torsional deflection, that this results in relatively little or insignificant torsional deflection in portion 110 of the suspension assembly of the present invention. Likewise, it is preferable that when portion 110 undergoes torsional deflection that this results in relatively little or insignificant torsional deflection in portion 108 of the suspension assembly of the present invention.

The present invention, in one embodiment, includes a suspension assembly which reduces damage to the frame of the illustrated carriage and other carriages. The suspension assembly includes a plurality of torsion shafts positioned under the frame along different axes. One of the torsion shafts is coupled to the frame, and the other torsion shaft is rigidly coupled to the first torsion shaft. The force which is transmitted from the wheels of the carriage is preferably simultaneously transmitted to both of the torsion shafts during operation of the carriage. Under full loads, one of the torsion shafts is relatively substantially deflected while the other torsion shaft is reserved, undergoing little or no deflection. The reserved torsion shaft absorbs or dissipates impact or shock to the carriage when the carriage is operated under this full load. This type of suspension assembly provides enhanced suspension for carriages and decreases damage to carriages.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A suspension assembly for a carriage having a frame, the suspension assembly comprising:
   a first elongated torsion member connectable to the frame, the first elongated torsion member having a position along a first axis;
   a second elongated torsion member operatively coupled to the first elongated torsion member, the second elongated torsion member having a first end and a second end positioned along a second different axis; and
   a plurality of wheel arms, one of the wheels arms operatively coupled to the first end of the second elongated torsion member and the other wheel arm operatively coupled to the second end of the second elongated torsion member.

2. The suspension assembly of claim 1, wherein the first elongated torsion member includes an inner elongated member and an outer elongated member.

3. The suspension assembly of claim 2, wherein the second elongated torsion member includes an inner elongated member and an outer elongated member.

4. The suspension assembly of claim 3, which includes at least one torsion member connector which connects the inner elongated member of the first elongated torsion member to the inner elongated member of the second elongated torsion member.

5. A suspension assembly for a carriage having a frame, the suspension assembly comprising:
   a first elongated torsion member connectable to the frame, the first torsion member positioned along a first axis, the first elongated torsion member including an outer elongated member which encases an inner elongated member and a plurality of elongated deformable members positioned between said outer elongated member and said inner elongated member;
   a second elongated torsion member having a first end and a second end positioned along a second different axis, the second elongated member including an outer elongated member which encases an inner elongated member and a plurality of elongated deformable members positioned between said outer elongated member and said inner elongated member;
   a plurality of torsion member connectors which connect the inner elongated member of the first elongated torsion member to the inner elongated member of the second elongated torsion member; and
   a first wheel arm operatively coupled to one of the first end of the second elongated torsion member; and
   a second wheel arm operatively coupled to the second end of the second elongated torsion member.

6. The suspension assembly of claim 5, wherein the inner elongated member of the first elongated torsion member has a variable position relative to the outer elongated member of the first elongated torsion member.

7. The suspension assembly of claim 6, wherein the inner elongated member of the second elongated torsion member has a variable position relative to the outer elongated member of the second elongated torsion member.

8. The suspension assembly of claim 5, wherein the first elongated torsion member and the second elongated torsion member each have a maximum deflection position.

9. The suspension assembly of claim 5, wherein each of the torsion member connectors defines an opening for receiving the inner elongated member of the first elongated torsion member and a different opening for receiving the inner elongated member of the second elongated torsion member.

10. The suspension assembly of claim 9, wherein said openings of one of the torsion member connectors have locations along said torsion member connector which are separated by a select distance.

11. The suspension assembly of claim 10, wherein said distance defines a lever arm which receives force from one of the wheel arms.

12. The suspension assembly of claim 11, wherein said lever arm has a force distribution characteristic which disproportionately distributes said force to the first elongated torsion member and the second elongated torsion member.

13. An axle for a carriage having a frame, the axle comprising:
a first elongated torsion member connectable to the frame, the first elongated torsion member having a first end and a second end positioned along a first axis;
a second elongated torsion member having a first end and a second end positioned along a second different axis;
a plurality of torsion member connectors, each of the torsion member connectors operatively coupling the first elongated torsion member to the second elongated torsion member; and
a plurality of wheel arms, one the wheel arms operatively coupled to the first end of the second elongated torsion member and the other wheel arm operatively coupled to the second end of the second elongated torsion member.

14. The axle of claim 13, wherein the first elongated torsion member includes an inner elongated member and an outer elongated member.

15. The axle of claim 13, wherein the second elongated torsion member includes an inner elongated member and an outer elongated member.

16. The axle of claim 13, which includes at least one torsion member connector which connects the inner elongated member of the first elongated torsion member to the inner elongated member of the second elongated torsion member.

17. The axle of claim 13, which includes a wheel spindle connected to each of the wheel arms.

18. The axle of claim 13, wherein each of the torsion member connectors includes an elongated arm.

19. A carriage having a torsion suspension assembly, the carriage comprising:
a frame;
a plurality of wheels rotatably coupled to the frame including a first wheel and a second wheel positioned along a common axis;
a first wheel arm operatively coupled to the first wheel;
a second wheel arm operatively coupled to the second wheel;
a first elongated torsion member connected to the frame, the first elongated torsion member positioned along a first axis,
a second elongated torsion member having a first end and a second end positioned along a second different axis, the first end operatively coupled to the first wheel arm, and the second end operatively coupled to the second wheel arm; and
a plurality of torsion member connectors which operatively couple the first elongated torsion member to the second elongated torsion member.

20. The carriage of claim 19, wherein the carriage includes a carriage selected from the group consisting of a trailer, a wagon, a truck, an automobile, a tractor and a vehicle.

21. The carriage of claim 19, wherein the first elongated torsion member includes an outer elongated member which encases an inner elongated member and a plurality of elongated deformable members positioned between said outer elongated member and said inner elongated member.

22. The carriage of claim 21, wherein the second elongated member includes an outer elongated member which encases an inner elongated member and a plurality of elongated deformable members positioned between said outer elongated member and said inner elongated member.

23. The carriage of claim 22, wherein the inner elongated member of the first elongated torsion member has a variable position relative to the outer elongated member of the first elongated torsion member.

24. The carriage of claim 23, wherein the inner elongated member of the second elongated torsion member has a variable position relative to the outer elongated member of the second elongated torsion member.

25. The carriage of claim 19, wherein the first elongated torsion member and the second elongated torsion member each have a maximum deflection position.

* * * * *